United States Patent [19]

Heidemann et al.

[11] Patent Number: 5,521,752
[45] Date of Patent: May 28, 1996

[54] FIBER-OPTIC AMPLIFIER WITH A DEVICE FOR MONITORING THE INPUT POWER

[75] Inventors: Rolf Heidemann, Tamm; Bernhard Junginger, Herrenberg, both of Germany

[73] Assignee: Alcatel N.V., Netherlands

[21] Appl. No.: 217,359

[22] Filed: Mar. 24, 1994

[30] Foreign Application Priority Data

Mar. 30, 1993 [DE] Germany ............... 43 10 292.1

[51] Int. Cl.⁶ .................................. H04B 10/08
[52] U.S. Cl. ........................... 359/341; 359/177
[58] Field of Search ................... 359/341, 110, 359/160, 177

[56] References Cited

U.S. PATENT DOCUMENTS

| 5,285,306 | 2/1994 | Heidemann | 359/160 |
| 5,299,048 | 3/1994 | Sugama | 359/179 |
| 5,363,385 | 11/1994 | Heidemmann | 372/6 |
| 5,374,973 | 12/1994 | Maxham et al. | 359/341 |

FOREIGN PATENT DOCUMENTS

| 0449475 | 10/1991 | European Pat. Off. |
| 0507367 | 10/1992 | European Pat. Off. |
| 2245757 | 1/1992 | United Kingdom |

OTHER PUBLICATIONS

"32 Channel, 48 dB CNR and 46 dB budget AM–VSB transmission experiment with field–ready post–amplifiers" in Optical Amplifiers and Their Applications, 1992 Technical Digest (Optical Society of America WAshington, DC 1992) vol. 17 91–94 B. Clesca, et al.

"Optical Communications Technology", second issue, Berlin, Heidelberg, New York, Tokyo, Springer PUblishers, pp. 296–302 by G. Grau.

Primary Examiner—Mark Hellner
Attorney, Agent, or Firm—Ware, Fressola, Van Der Sluys and Adolphson

[57] ABSTRACT

The input light in fiber-optic amplifiers is monitored in order to turn off the system in which it is contained, or individual components of the system, e.g. the fiber-optic amplifier itself, when input light is lacking. To that effect, in known fiber-optic amplifiers, a portion of the input light is coupled out by a coupler. However, this coupler has disadvantages; e.g. the signal-to-noise ratio deteriorates. To monitor the input light, the fiber-optic amplifier of the present invention uses a device (4), which couples out and evaluates the pump light that was not absorbed by the section of the optical waveguide (2).

5 Claims, 1 Drawing Sheet

FIBER-OPTIC AMPLIFIER WITH A DEVICE FOR MONITORING THE INPUT POWER

TECHNICAL FIELD

The invention concerns a fiber-optic amplifier having a device for monitoring light input power to the amplifier.

BACKGROUND OF THE INVENTION

Fiber-optic amplifiers of the cited type are known, e.g. from: B. Clesca, et al, "32 channel, 48 dB CNR and 46 dB budget AM-VSB transmission experiment with field-ready post-amplifiers" in Optical Amplifiers and Their Applications, 1992 Technical Digest (Optical Society of America, Washington, D.C., 1992), Vol. 17, pages 91 to 94. They show a fiber-optic amplifier which has two pump light sources that emit pump light at a wavelength of 1480 nm, two pump light couplers and one section of an optical waveguide that is doped with erbium ions.

In optical transmission systems with optical waveguides, fiber-optic amplifiers serve to amplify the optical signals in optical waveguides.

Such transmission systems have the requirement e.g. that the transmission line is safe for the eyes, i.e. that a person's eyes are not endangered when looking intentionally or unintentionally into an interrupted optical waveguide. To ensure this safety requirement, the system, or individual components of the system, must be turned off in the event of a fiber break.

An interruption of the transmission line can be determined e.g. by monitoring the input light of a fiber-optic amplifier. Missing input light could mean that the transmission line has been interrupted before this fiber-optic amplifier.

Monitoring the input light of a fiber-optic amplifier is known from the above cited literature. Therein a part of the input light is coupled out through a coupler, which is part of the fiber-optic amplifier, and detected by a photodiode. The signal-to-noise ratio deteriorates because the amplifying part of the fiber-optic amplifier has less light power available, and the insertion of the coupler causes additional damping. Furthermore, this coupler causes additional expense for material and labor time.

SUMMARY OF THE INVENTION

The invention has the task of indicating a fiber-optic amplifier in which the input light can be monitored without the cited drawbacks. This task is fulfilled by a fiber-optic amplifier for amplifying an optical signal, comprising a section of optical waveguide, doped with a rare-earth element and having a first end and a second end, and at least one pump-light coupler which couples pump light emitted by at least one pump-light source into the section of optical waveguide, characterized in that at least one device is provided which couples out and evaluates all or pan of the pump light still present after the section of optical waveguide as viewed in the direction of propagation of the pump light. Advantageous configurations of the invention are where the device and the pump-light coupler are so connected to the section of optical waveguide that the section of optical waveguide is disposed between the device and the pump-light coupler, where the device contains a coupler and an optical-to-electrical transducer which detects the pump light coupled out by the coupler, and where the device switches off the fiber-optic amplifier when the pump light still present exceeds a threshold value.

BRIEF DESCRIPTION OF THE DRAWINGS

The invention will now be explained in greater detail by means of the drawings, where.

BEST MODE FOR CARRYING OUT THE INVENTION

Figure 1:
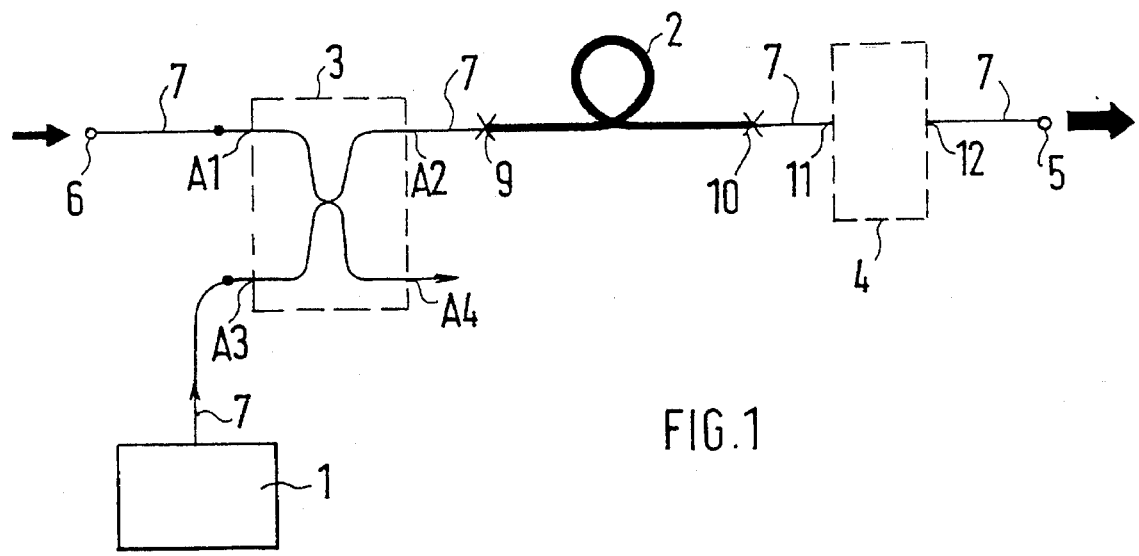
FIG. 1 is a configuration example of a fiber-optic amplifier in which the pump light and the optical signal propagate in the same direction.

FIG. 1 depicts a fiber-optic amplifier in a basic construction that is relevant to the invention. Potential optical insulators and power supplies are not shown. A signal to be amplified enters the fiber-optic amplifier through input 6, and leaves it amplified through output 5. The amplification is indicated by different size arrows at the input and output of the fiber-optic amplifier.

The amplifier has a pump-light-emitting pump light source 1, a section of optical waveguide 2 doped with a rare-earth element, e.g. erbium, which has a first end 9 and a second end 10, and a wavelength-selecting pump light coupler 3 with four connectors A1 to A4. Such couplers are e.g. described in G. Grau, "Optical Communications Technology", second issue, Berlin, Heidelberg, New York, Tokyo, Springer Publishers, 1986, pages 296 to 302. In addition, it has a device 4 that couples out and evaluates any pump light still present after the section of optical waveguide 2. The device 4 has a connector 11 and a connector 12.

The first connector A1 of the pump light coupler 3 is connected to input 6, the second connector A2 to the first end 9 of the optical waveguide section 2, and the third connector A3 is connected to the pump light source 3. The second end 10 of the optical waveguide section 2 is connected through an optical waveguide 7 to connector 11 of the device 4, and its connector 12 to output 5 of the fiber-optic amplifier. The connection of the individual components, which have equal reference numbers, is achieved either directly or through optical waveguide 7, i.e. the connection between the end 10 of the optical waveguide section 2 and connector 11 of device 4 can also be direct. The pump light is supplied to the section of optical waveguide 2 in the propagation direction of the optical signal.

The device 4 uses the fact that the absorption of the pump light supplied to the section of optical waveguide 2 is proportional to the number of erbium ions which are in the normal (basic) energy state. The pump light transfers the erbium ions from the normal state into an excited state, from where they return to the normal state through either spontaneous or stimulated emission. The stimulated emission is excited by the optical signal to be amplified, which runs through the section of optical waveguide 2.

If the optical signal is large, the majority of the excited erbium ions are returned to the normal state by stimulated emission; and thus there are more erbium ions in the normal state than if no or only a little signal is supplied. For the large optical signal case, the absorption of the pump light is large, and little unabsorbed pump light exits from the end of the optical waveguide section.

More erbium ions are in the excited state than in the normal state, if the optical signal is small or missing altogether. In that case, the absorption of the pump light is small and unabsorbed pump light increasingly exits from the end of the optical waveguide section.

The unabsorbed pump light is detected and evaluated by device 4, so that it can be determined whether or not input light is present at input 6. This takes place e.g. by establishing a threshold value for the detected pump light.

If the intensity of the detected pump light is above the threshold value, it means that too little pump light is absorbed and the optical signal is too small or is missing altogether.

In that event, if the intensity of the pump light that is still present exceeds a threshold value, the fiber-optic amplifier or the entire system can be mined off. The eye safety requirement can thus be complied with.

If the intensity of the detected pump light is below the threshold value, it means that sufficient optical signal is present.

A premise for that is that the pump light is coupled out of the optical waveguide 7 and hits a detector, which is sensitive to the wavelength of the pump light being used. This can be achieved e.g. with the configuration examples of the device 4 shown in FIG. 2.

Figure 2:
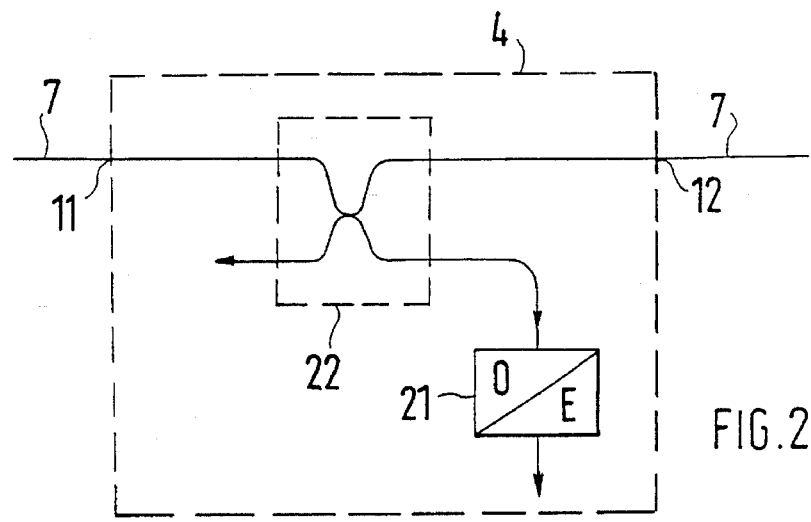
FIG. 2 is a configuration example of a device that couples out pump light.

In FIG. 2, a wavelength-selecting coupler 22 of the above mentioned type (G. Grau, "Optical Communications Technology") is inserted into the optical waveguide 7, which is connected to the second end 10 of the optical waveguide section 2. The pump light coupled out of optical waveguide 7, and which is not absorbed, is supplied to an optical-electric transducer 21, which contains a photodiode. This is followed by a not illustrated processing unit, which evaluates the electrical signal that corresponds to the pump light. It can have a storage unit, for example, in which the threshold value for the input light is stored.

Figure 3:
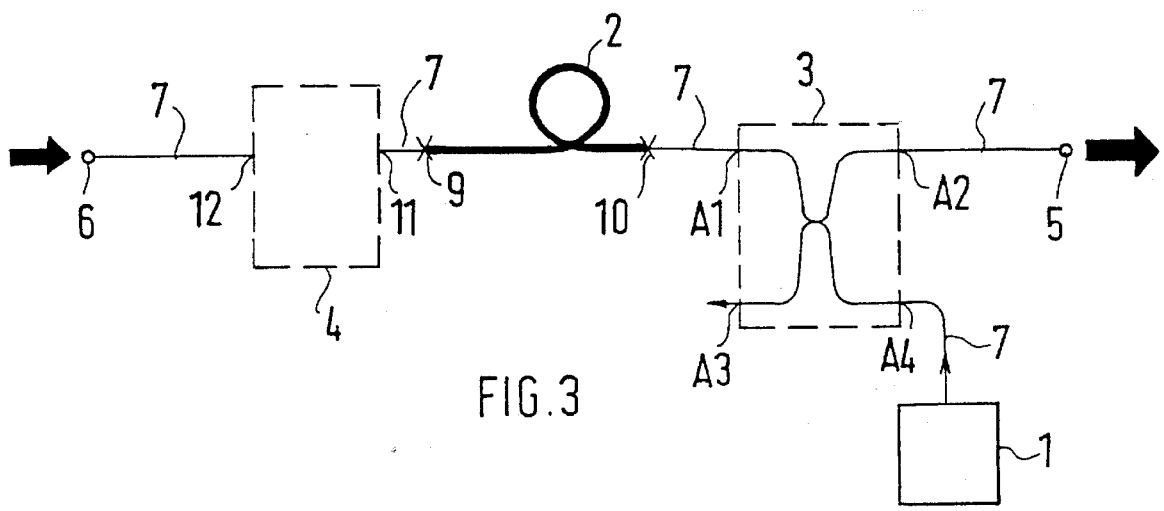
FIG. 3 is a configuration example of a fiber-optic amplifier in which the pump light and the optical signal propagate in opposite directions.

The configuration example of FIG. 3 has the same components and reference signs as that shown in FIG. 1. The fact that in this instance the pump light is supplied to the section of optical waveguide 2 in the opposite sense to the direction of propagation, produces the following arrangement:

The device 4 is located between the input 6 and the first end 9 of the optical waveguide section 2. Here, input 6 is connected to the connector 12 of device 4 by an optical waveguide 7, and connector 11 is also connected to the first end 9 of the optical waveguide section 2 by an optical waveguide 7. The second end 10 of the optical waveguide section 2 is connected to the first connector A1 of pump light coupler 3 by an optical waveguide 7. Its second connector A2 is connected to output 5, and its fourth connector A4 is connected to the pump light source 1. The depicted optical waveguides 7 can also be omitted.

The configuration example shown in FIG. 2, as in FIG. 1, is designed for the case where the pump light propagates in the direction of the optical signal propagation. The figures must be changed accordingly for the case shown in FIG. 3, where the pump light propagates in the opposite direction of the optical signal.

The configuration examples shown in FIGS. 1 and 3 represent a minimum configuration. Pump light from two pump light sources can also be supplied simultaneously to the optical waveguide section 2. In that case, the optical waveguide section 2 is located between a first and a second pump light coupler. The basic idea of the invention also applies in this instance.

We claim:

1. A fiber-optic amplifier for amplifying an optical signal, comprising a section of optical waveguide (2), doped with a rare-earth element and having a first end (9) and a second end (10), and at least one pump-fight coupler (3) which couples pump light emitted by at least one pump-light source (1) into the section of optical waveguide (2), characterized in that at least one device (4) is provided which couples out and evaluates all or part of the pump light still present beyond the section of optical waveguide (2) as viewed in the direction of propagation of the pump light; wherein said device (4) has means (21) for generating an output signal that causes the fiber-optic amplifier to be switched off if the pump light evaluated exceeds a threshold value.

2. A fiber-optic amplifier as claimed in claim 1, characterized in that the device (4) and the pump-light coupler (3) are so connected to the section of optical waveguide (2) that the section of optical waveguide (2) is disposed between the device (4) and the pump-light coupler (3).

3. A fiber-optic amplifier as claimed in claim 1, characterized in that the device (4) contains a coupler (22) and wherein the means for generating an output signal that causes the fiber-optic amplifier to be switched off if the pump light evaluated exceeds a threshold value is an optical-to-electrical transducer (21) which detects the pump light coupled out by the coupler (22).

4. A fiber-optic amplifier for amplifying an optical signal, comprising a section of optical waveguide (2), doped with a rare-earth element and having a first end (9) and a second end (10), and at least one pump-light coupler (3) which couples pump light emitted by at least one pump-light source (1) into the section of optical waveguide (2), characterized in that:

A) the pump-light coupler (3) couples the pump light into the second end (10) of the section of optical waveguide (2);

B) that the optical signal propagates in the opposite direction with respect to the pump light and thus enters the first end (9) of the section of optical waveguide (2); and C) that at least one device (4) is provided which, couples out and evaluates all or part of the pump light still present beyond the section of optical waveguide (2) as viewed in the direction of propagation of the pump light; wherein said device (4) has means (21) for generating an output signal that causes the fiber-optic amplifier to be switched off if the pump light evaluated exceeds a threaded value.

5. A fiber-optic amplifier as claimed in claim 4, characterized in that the device (4) contains a coupler (22) and wherein the means for generating an output signal that causes the fiber-optic amplifier to be switched off if the pump light evaluated exceeds a threshold value is an optical-to-electrical transducer (21) which detects the pump light coupled out by the coupler (22).

* * * * *

UNITED STATES PATENT AND TRADEMARK OFFICE
CERTIFICATE OF CORRECTION

PATENT NO. : 5,521,752
DATED : May 28, 1996
INVENTOR(S) : Rolf Heidemann
Bernhard Junginger It is certified that error appears in the above-indentified patent and that said Letters Patent is hereby corrected as shown below:

Column 4, line 8, (Claim 1 line 4) "pump-fight" should be --pump-light--

Column 4, line 45, (Claim 1, line 15) after "which", please delete ",".

Signed and Sealed this

Twenty-second Day of October, 1996

*Attest:*

BRUCE LEHMAN

*Attesting Officer*     *Commissioner of Patents and Trademarks*